United States Patent
Livingston (12)

(10) Patent No.: US 6,452,607 B1
(45) Date of Patent: Sep. 17, 2002

(54) CONTEXT SENSITIVE USER INTERFACE HELP FEATURE

(75) Inventor: Kris R. Livingston, Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 411 days.

(21) Appl. No.: 09/018,391

(22) Filed: Feb. 4, 1998

(51) Int. Cl.[7] ................................................. G06F 3/00
(52) U.S. Cl. ........................ 345/705; 345/808; 345/840
(58) Field of Search ................................. 345/336, 338, 345/347, 354, 975, 705, 708, 808, 840

(56) References Cited

U.S. PATENT DOCUMENTS

| 4,648,062 A | * | 3/1987 | Johnson et al. | 345/338 |
| 5,155,806 A | * | 10/1992 | Hoeber et al. | 345/338 |
| 5,175,812 A | * | 12/1992 | Krieger | 345/338 |
| 5,581,684 A | * | 12/1996 | Dudzik et al. | 345/338 |
| 5,710,898 A | * | 1/1998 | Tozuka | 345/338 |
| 5,715,415 A | * | 2/1998 | Dazey et al. | 345/338 |

* cited by examiner

*Primary Examiner*—Raymond J. Bayerl
*Assistant Examiner*—Cuong T. Thai
(74) *Attorney, Agent, or Firm*—Lane R. Simmons

(57) ABSTRACT

A help feature for a user interface includes a help control, such as a graphical button, displayed adjacent to a control option of the user interface. The help control references the control option for obtaining help information about the control option. The help control is displayed, and remains displayed, in response to a detected noteworthy status of the control option. Specifically, the help control is displayed automatically, without user interaction, in the event the control option is disabled and noteworthy. Alternatively, the control option is displayed in the event it is enabled and noteworthy. The help control is displayed non-intrusively relative to other elements of the user interface. Importantly, when the help control is selected by the user, context-sensitive help information is displayed describing, respectively, why the control option is disabled or why it is enabled and noteworthy.

20 Claims, 4 Drawing Sheets

CONTEXT SENSITIVE USER INTERFACE HELP FEATURE

FIELD OF THE INVENTION

This invention relates in general to computer system user interfaces and, more particularly, to graphical user interface help features.

BACKGROUND OF THE INVENTION

Graphical user interfaces (GUIs) are commonly used with computers for enabling simplified interaction between a user and computer. GUIs are commonly developed in software, although firmware and/or circuit embedded implementations of GUI sub procedures or even entire routines are not uncommon. Graphical interfaces provide an appealing option over textual entry of commands for functional control of the computer and/or peripherals associated with the computer.

The use of GUIs has exploded with the ongoing development of faster and more capable computing platforms and resources. For example, "tab sheets" are known GUI components (i.e., graphical representations or images) that provide a means for presenting information in a manner that portrays overlaid sheets of data. Each tab sheet can be individually selected or manipulated (on screen) for viewing data associated with that tab sheet or for viewing data on an underlying sheet. Other GUI components, such as icons or buttons, may visually represent features for enabling computer functions, such as opening, closing or deleting files. GUIs may mix graphical images with textual descriptions of the configuration or function represented by the image.

Although a GUI, component, or combination of components may portray a certain "look and feel" relative to functional interaction with the computer, and although the depictions, themes or presentations displayed by such images are as varied as the minds that conceive them, the search for the most "user-friendly" GUI seems never ending. A "user-friendly" GUI provides an easy-to-understand and easy-to-use interface that enables a user to more easily accomplish the purpose of the interaction with the computer.

Various GUI "help" features have been provided in the art for allowing a user to obtain on-line help information. For example, a common help system in Windows™ software involves the use of the right mouse button to click on a particular control feature, whether the control is enabled or disabled. This action produces a "pop-up menu" containing a selectable item labeled, "What's This?". When the user selects this item, the software presents a simple window containing a general-purpose description of the control that was right-clicked. The biggest problem with this type of help system is that for any one control that is right-clicked on, there is only one help message available and it is not context-specific. Because of this, the writers of the software must try to put enough information in the message to be helpful in a variety of contexts. But, if the help message is too large, the user might feel intimidated by the volume of text and overlook the possible resolution that is specific to the issue at hand. Another problem is that the user must actively request the help. To this regard, if the user doesn't happen to think of the help system, the software doesn't do anything to remind him of it, and the help message will go unread.

Another "help" system provided in the Macintosh® operating system is called "Balloon Help". It operates by tracking the movement of the mouse pointer and presenting small windows shaped like cartoon speech bubbles next to the control features over which the mouse pointer passes. Advantageously, these windows contain some context-specific descriptions for the control option at which the mouse cursor is currently pointing. In other words, the help balloons typically give useful information about the control and its current setting, and perhaps an interpretation of that setting given the current context of the user interface.

However, there are several disadvantages to this scheme. For example, the "help" mechanism is not always "on". Namely, to activate balloon help, the user must go to a help menu and select "Show Balloons." Additionally, even if the balloon help feature is turned on, there may not be any useful help available because it's up to the application vendor to implement the help features, and it takes quite a lot of time to develop truly useful help messages that remain helpful throughout a wide variety of contexts. As a result, there are applications that simply do not support balloon help. Consequently, users typically may not bother to turn it on. However, even when balloon help is fully implemented with really useful messages, the dynamics of the balloons popping up and darting about the screen as the mouse (or other input device) is moved around are often regarded by the user as annoying, further discouraging them from ever using this help feature.

Accordingly, an object of the present invention is to provide an improved graphical user interface "help" system for a computing environment.

SUMMARY OF THE INVENTION

According to principles of the present invention in a preferred embodiment, a help feature for a user interface includes a help control, such as a graphical button, displayed adjacent to a control option of the user interface. The help control references the control option for obtaining help information about the control option. According to further principles, the help control is displayed, and remains displayed, in response to a detected noteworthy status of the control option. Specifically, the help control is displayed automatically, without user interaction, in the event the control option is disabled and noteworthy. Alternatively, the control option is displayed in the event it is enabled and noteworthy. Also, preferably, the help control is displayed non-intrusively relative to other elements of the user interface. Importantly, when the help control is selected by the user, context-sensitive help information is displayed describing, respectively, why the control option is disabled or why it is enabled and noteworthy.

Other objects, advantages, and capabilities of the present invention will become more apparent as the description proceeds.

DETAILED DESCRIPTION OF THE INVENTION

Figure 1:
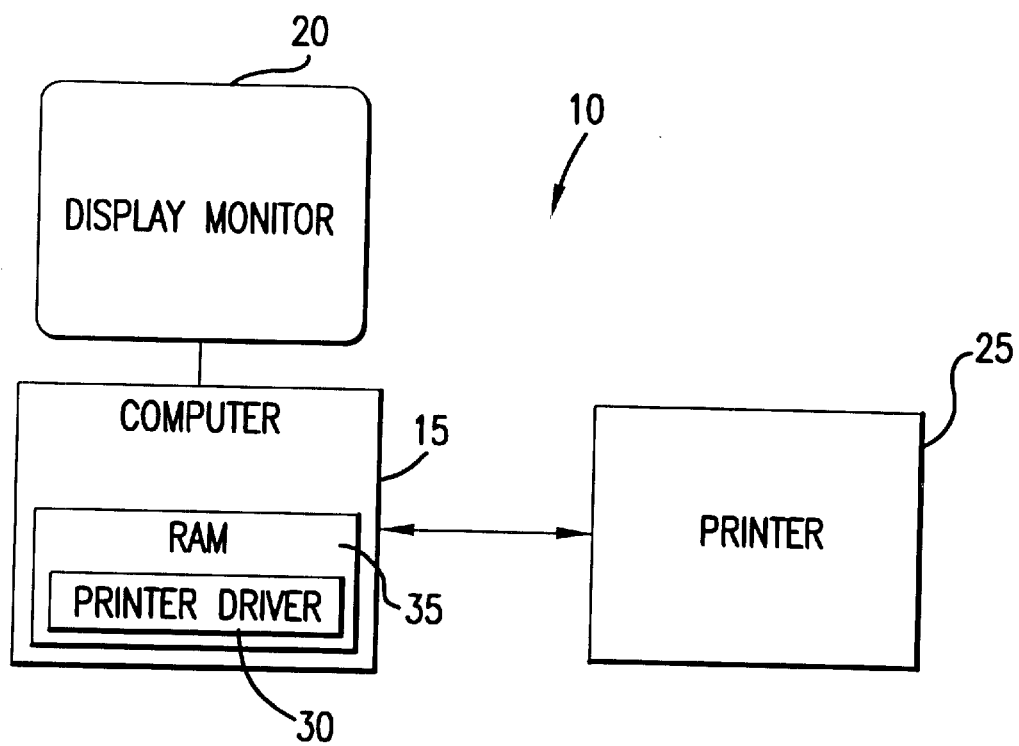
FIG. 1 is a block diagram of a computing system employing one embodiment of the present invention user interface.

FIG. 1 is a block diagram of a computing system 10 having general purpose computer 15 in communication with display monitor 20 and connected to printer (peripheral) device 25. Computing system 10 employs one or more embodiments of the present invention user interface help feature which is managed (executed) by computer 15 and displayed on monitor 20 for allowing a user to interact with and control printer device 25. In a preferred embodiment, the present invention user interface is implemented in software as part of printer driver 30 stored in random access memory (RAM) 35 of computer 15. Although computing system 10 is described generally herein in connection with printer 25 as they relate to the user interface of the present invention, it will be understood by those of ordinary skill in the art that any general purpose computing system and/or other peripheral device is also equally applicable. For example, other peripherals for which the present invention user interface may be adapted include scanners, facsimile devices, copiers, etc. It is also understood that the present invention user interface is applicable to controlling other computing features that are "non-peripheral" type features, such as for any application specific interface (i.e., word processing, WEB browser, disk manager, etc.). Furthermore, it is understood that the present invention is easily implemented using any of a variety of software and hardware tools known in the art. Additionally, printer 25 may be located remotely from computer 15, and computer 15 may be located remotely from display monitor 20, as is commonly known in networked environments.

Figure 2:
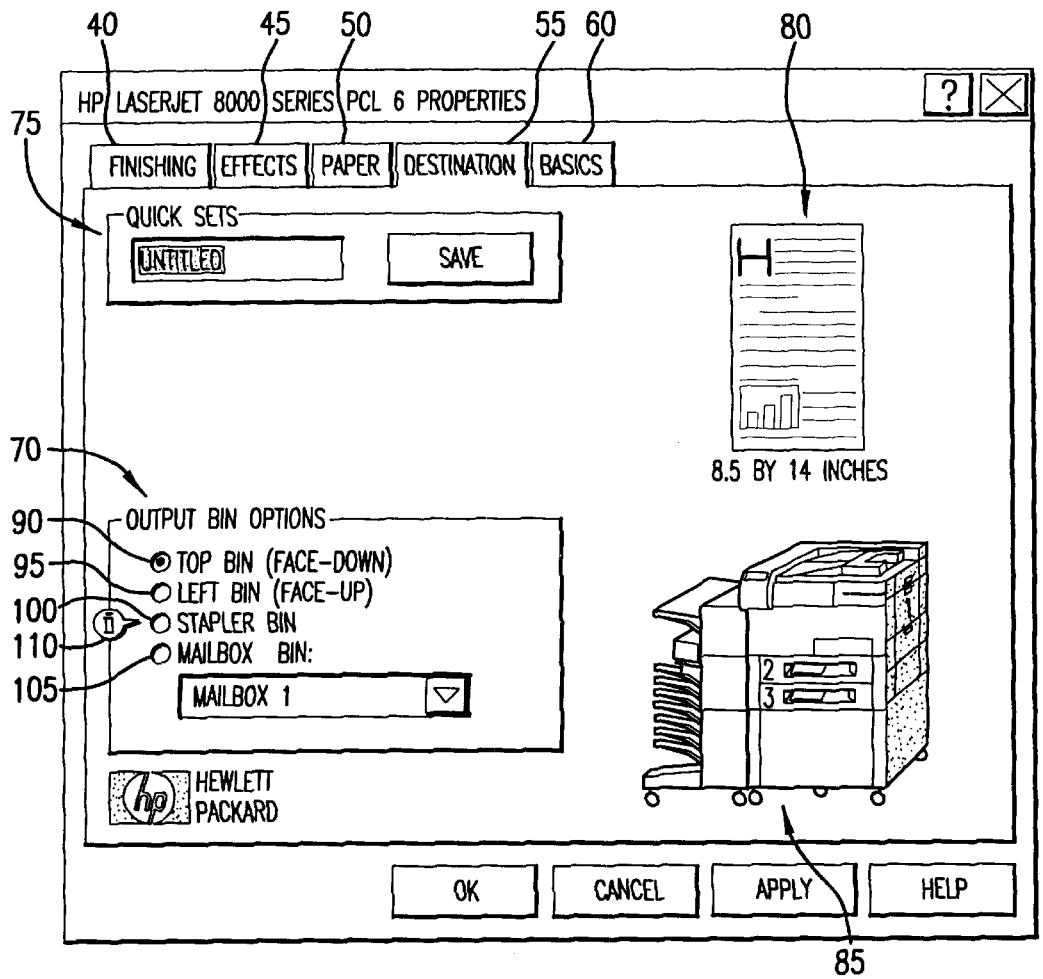
FIG. 2 depicts a user interface dialog window having a dynamic and context sensitive help control associated with a disabled, noteworthy control option according to one embodiment of the present invention.

FIG. 2 depicts a user interface dialog window according to one embodiment of the present invention and as displayed on monitor 20 (FIG. 1). In the examples shown and discussed herein, the dialog windows are produced by print driver 30 for managing certain properties of printer 25. Specifically, FIG. 2 depicts a tab sheet interface having multiple tab sheets 40, 45, 50, 55 and 60 (hereinafter 40–60) associated with the user interface of the present invention. In FIG. 2, the tab sheets 40, 45, 50 and 60 are disposed behind displayed "Destination" tab sheet 55, with only their named tab extensions displayed. The "destination" operations available with tab sheet 55 (in this example) are described in the user selectable control options (features) area entitled "Output Bin Options" 70. "Destination" tab sheet 55 also includes a control option entitled "Quick Sets" 75 that allows a user to name and save (capture) a summary of print job options that have been selected from across any or all of the multiple tab sheets 40–60 that provide for print job control settings relative to printer 25. Tab sheet 55 also includes user interface component 80 which is a mock-up representation of a preview of a page to be printed per the "summary" of settings selected by a user. In this example, component 80 represents and indicates the user has selected an 8½ by 14 inch sheet size. Similarly, interface component 85 is a mock-up representation of printer 25 and also depicts certain of the "summary" of print settings selected by the user.

Returning now to the "Output Bin Options" 70, the output bin control options shown are "Top Bin" 90, "Left Bin" 95, "Stapler Bin" 100, and "Mailbox Bin" 105. Importantly, each of the control options 90, 95 and 105 are enabled (not dimmed), and therefore user selectable. However, "Stapler Bin" option 100 is disabled (dimmed), and therefore not user selectable. As not uncommon with computer programs and interfaces, it is not obvious to a user why option 100 is disabled and not selectable. Therefore, it can be said that control option 100 reflects a "noteworthy" status because it is not obvious to a user why it is disabled.

Fortunately, under principles of the present invention, help control 110 is included adjacent to control option 100 because option 100 is detected as being noteworthy. In the example shown, help control 110 is a graphical button (icon) in the form of a small cartoon speech type bubble that references or points to the disabled option 100. The button (bubble) 110 includes the well known letter "i" to represent to a user that information is available. As such, a user recognizes that bubble 110 is a selectable control for enabling a display of help information. More specifically, under the present invention, help control (bubble control) 110 is user selectable for enabling a display of context specific help information that explains why "Stapler Bin" control option 100 is disabled and what the user must do to enable it. Although a graphical bubble icon includes the letter "i" in the example shown, it is obvious that other icons or representations are equally usable. Preferably, however, the icon used is graphically presented as if to say "Here is some information about this control option."

According to one embodiment of the present invention, help control 110 is displayed dynamically (i.e., without user interaction) adjacent to control option 100, in response to a detected status of the control option. Additionally, it remains displayed until the referenced control option 100 no longer reflects a "noteworthy" status. In this case, the noteworthy status of disabled control option 100 is automatically detected by the user interface whereby help control 110 is automatically displayed, thus enabling a user to select on the help control for obtaining context sensitive help information about the disabled control option.

Additionally, preferably, the help control 110 of the present invention is not "visually noisy" or annoying to a user relative to neighboring control features or the entire display at hand. Namely, help control 110 is relatively small and is disposed relatively close to control option 100 so that other interface components or options are not obstructed thereby. In other words, help control 110 is non-intrusively displayed. Moreover, preferably, help control 110 is relatively static in its display presence. Specifically, once the status of control option 100 is deemed noteworthy, help control 110 is displayed and remains displayed until the status of control option 100 changes. Help control 110 does not appear and disappear with the user's movement of the mouse or other input device. As such, it can easily be ignored when the user is not interested in the control(s) to which it relates. However, if the user is interested, he or she need only click on the help control 110 to display a helpful context-sensitive message.

In contrast, Balloon Help on the Macintosh and mechanisms like "tool tips" on Windows (which is similar in operation to Macintosh Balloon Help, but typically with much less detailed and less helpful messages), tend to generate enough "visual noise" on the computer screen to distract or annoy the user. For example, it can be especially distracting to a user when help displays pop up all over the screen as the mouse is moved around. As a result, the user often tends not to activate these mechanisms (given a choice), and whatever help information is available goes unused.

Figure 3:
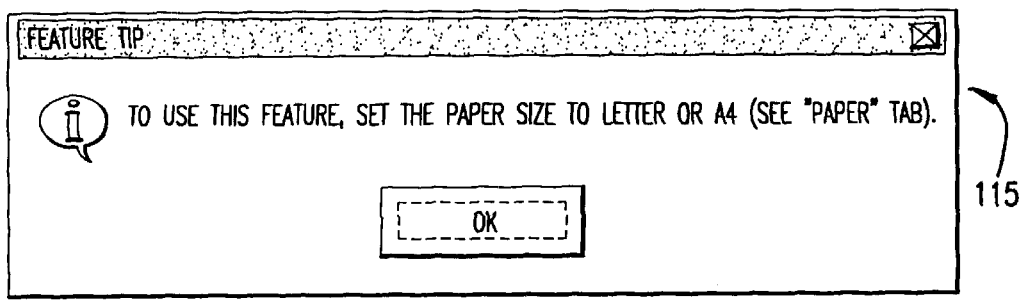
FIG. 3 depicts one embodiment of a user interface dialog window having exemplary context-specific help information that is displayed when a user selects the help control of FIG. 2.

Referring now to FIG. 3, a user interface dialog window 115 depicts exemplary context-specific information that is displayed when a user selects help control 110 of FIG. 2. It is important to note that there is often more than one possible reason that a control option 100 (FIG. 2) is noteworthy or disabled. Thus, help control 110 brings up a context-specific message that explains why, at this point, the control 100 is disabled. As shown, context-specific message 115 indicates that control option 100 (FIG. 2) is disabled because the stapler only works with Letter and A4 paper sizes.

It has been mentioned that the help control 110 of the present invention appears next to a control option 100 that is "noteworthy". FIGS. 2 and 3 depict an example of a noteworthy, disabled control option 100. In this case, as discussed, the purpose of the help control is to selectively enable an explanation of why the control is disabled so the user can take the appropriate steps to enable it and use the feature if desired. However, the present invention provides help control in other contexts also as will be seen in reference to help control 150 of FIG. 4.

Figure 4:
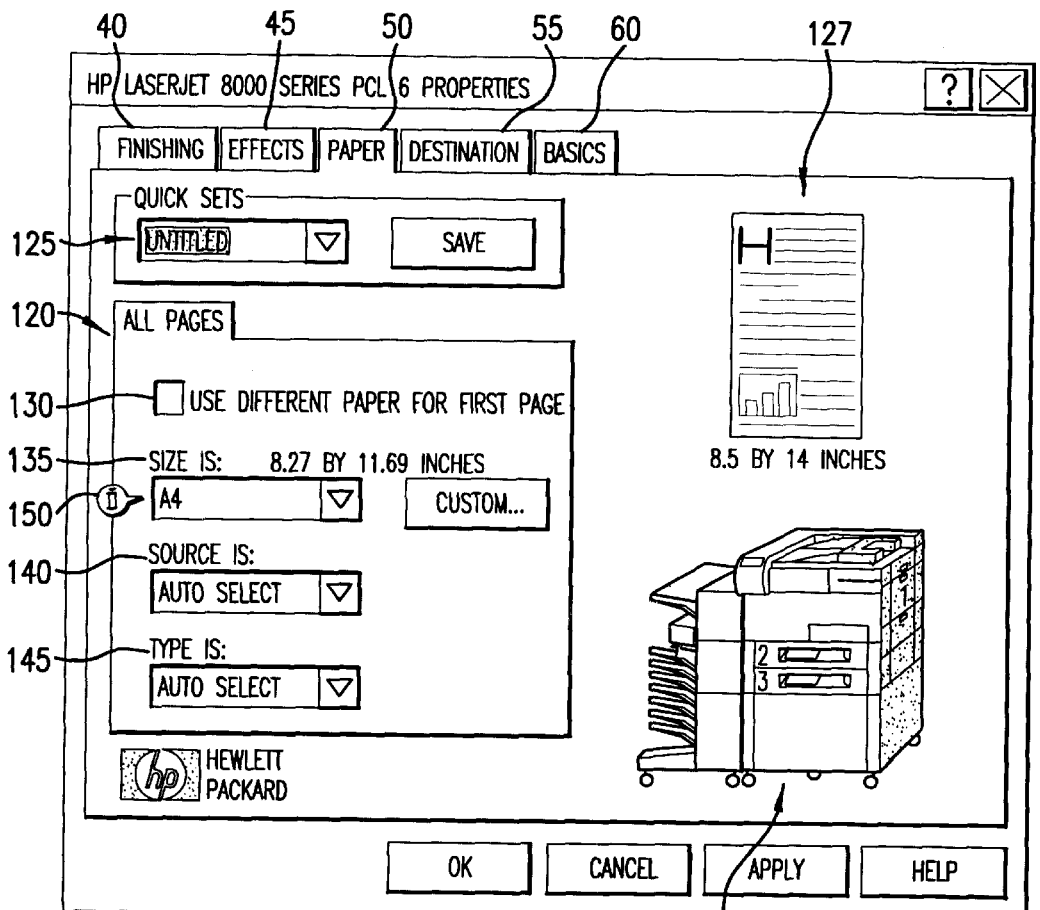
FIG. 4 depicts a user interface dialog window having a dynamic and context sensitive help control associated with an enabled, noteworthy control option according to one embodiment of the present invention.

Thus, referring now to FIG. 4, "Paper" tab sheet 50 is displayed in full with tab sheets 40, 45, 55 and 60 disposed behind the "Paper" tab sheet 50. The "Paper" operations available with tab sheet 50 (in this example) are described in the user selectable control options (features) area entitled "All Pages" 120. "Paper" tab sheet 50 also includes a "Quick Sets" control option 125 similar to the "Quick Sets" 75 in "Destination" tab sheet 55 (FIG. 1). Additionally, page preview component 127 is similar to component 80 of tab sheet 55 and represents a page preview image depicting that the user has selected an 8½ by 14 inch sheet size. Printer component 129 is similar to component 85 of tab sheet 55.

Control options area "All Pages" 120 includes paper control options 130 "Use different paper for first page", 135 "Size is:", 140 "Source is:", and 145 "Type is:". Importantly, each of the control options 130, 135, 140 and 145 are enabled (not dimmed), and therefore user selectable. However, in this screen shot, the user may notice that the size of the selected paper (A4, 8.27 by 11.69) does not match the size (8½ by 14) shown in the preview image 127. Thus, in this context and according to the present invention, help control 150 is presented next to a "noteworthy" enabled control option 135 (rather than a disabled option 100 of FIG. 2). Control option 135 reflects a "noteworthy" status because it is not obvious to a user why it is displaying seemingly conflicting information (i.e., it is not behaving as the user might expect). In other words, control option 135 reflects a noteworthy or cautionary status about which the user might wish to obtain more information. Fortunately, the present invention detects this noteworthy status and automatically displays help control 150 without any user interaction, thus affording the user an opportunity to get more information about control option 135. Accordingly, when help control 150 is selected in this example, context-sensitive help information is displayed, specific to why the size 135 of the selected paper (A4, 8.27 by 11.69) does not match the size (8½ by 14) shown in the preview image 127. Again, importantly, help control 150 is automatically displayed adjacent to option 135 based on the detected status of option 135 as being noteworthy, and it remains displayed until the status of option 135 changes.

Figure 5:
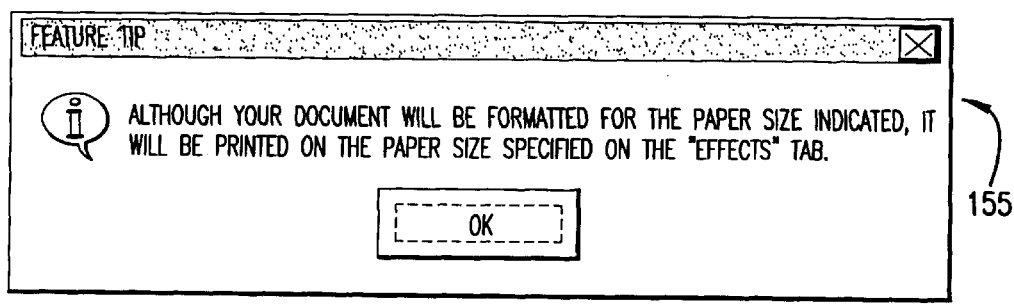
FIG. 5 depicts one embodiment of a user interface dialog window having exemplary context-specific information that is displayed when a user selects the help control of FIG. 4.

FIG. 5 depicts the context-sensitive help message 155 that is displayed (for this example) when help control 150 of FIG. 4 is selected. The message 155 directs the user to the "Effects" tab 45 (FIGS. 2 and 4), where he or she will find an option (not shown) that has been set to scale the document to an alternate paper size without reformatting the document. In essence, then, "Paper" tab 50 of FIG. 4 states that the document will be formatted to A4 paper size, but will actually be printed on 8½ by 14 inch size paper. Thus, without this type of active, context-specific help 155, the user might waste a lot of time searching through the various tab pages of the driver looking for clues about the control that they're interested in.

Figure 6:
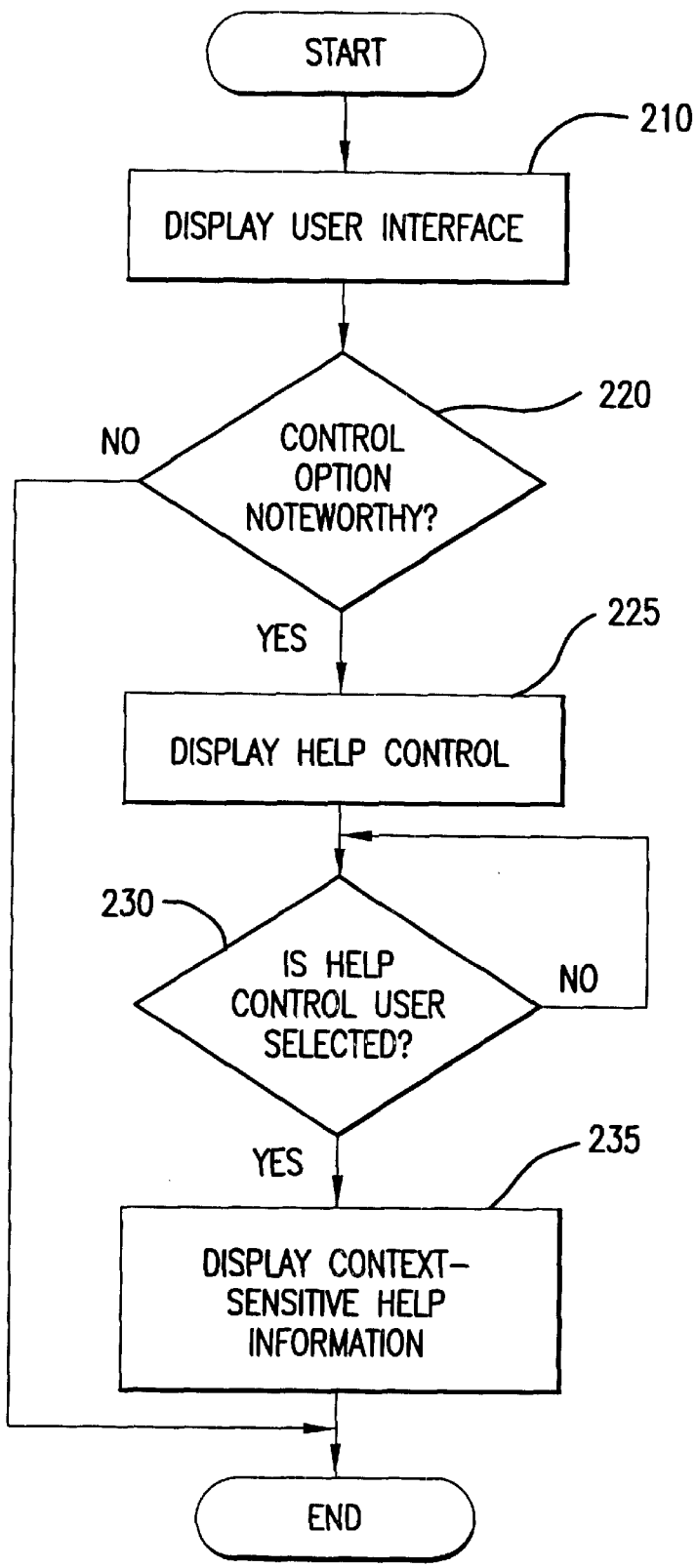
FIG. 6 is a flow chart depicting one embodiment of a preferred method of the present invention.

Referring now to FIG. 6, a flow chart depicts one embodiment of a preferred method of the present invention. First, 210, printer driver 30 (FIG. 1) displays the user interface on display monitor 20. Next, 220, it is determined whether a given control option 100, 135 is noteworthy. Namely, does that control option merit additional attention, or is that control option operating in a way that the user might not expect, or is there some cautionary information regarding the use of that control? If the control option is deemed noteworthy 220, then a help control 110, 150 is automatically displayed 225 adjacent to the control option 100, 135. In the event the help control is subsequently selected by the user 230, then context-sensitive help information is displayed 235 that describes, specifically, why the control option is noteworthy. Once the user closes the context-sensitive help information so that it is not displayed, then execution flow returns to re-display the user interface 210. In the event a given control option is not considered noteworthy 220, then no help control is displayed and execution flow returns to re-display the user interface 210.

In summary, in a preferred embodiment, this invention provides help that is context-specific in two ways. First, the help control 110, 150 doesn't appear unless the control option it relates to is noteworthy or in a state that merits the user's attention. Second, when it does appear and the user selects it, it produces a message that is helpful and specific to the current context of the user interface. Additionally, the context-sensitive messages are not annoying because they do not appear unless the user requests them by selecting the help control 110, 150. Moreover, the help control is very accessible (i.e., doesn't require the user to turn on a "help mode") and because it automatically appears only when needed.

Finally, what has been described above is a graphical user interface employing improved, dynamic help features. It will be obvious to one of ordinary skill in the art that the present invention is easily implemented utilizing any of a variety of software, firmware and/or hardware components existing in the art. Moreover, while the present invention has been described by reference to specific embodiments, it will be apparent that other alternative embodiments and methods of implementation or modification may be employed without departing from the true spirit and scope of the invention.

What is claimed is:

1. A help feature for a user interface, comprising a help control displayed adjacent to a control option of the user interface, the help control referencing the control option for obtaining help information about the control option, wherein the help control is displayed in response to a detected status of the control option.

2. The user interface of claim 1 wherein the help control includes a graphical button.

3. The user interface of claim 1 wherein the detected status of the control option is a noteworthy status.

4. The user interface of claim 1 wherein the detected status of the control option is, alternatively, an enabled or disabled status.

5. The user interface of claim 1 wherein the help control is displayed automatically without user interaction in response to the detected status of the control option.

6. The user interface of claim 1 wherein the help control is displayed non-intrusively relative to other elements of the user interface.

7. The user interface of claim 1 wherein the help control enables a display of help information for the control option in the event the help control is selected by a user.

8. The user interface of claim 7 wherein the help information is context sensitive.

9. The user interface of claim 8 wherein the context sensitive help information displays instructions for enabling the control option in the event the control option is disabled, and wherein the context sensitive help information displays why the control option is noteworthy in the event the control option is enabled.

10. A computing system comprising:
  (a) a computing device for executing user interface code, and wherein the computing device is in communication with a display device; and,
  (b) a user interface displayable on the display device in response to the user interface code being executed, the user interface for allowing a user to communicate with the computing device and comprising a help control displayed adjacent to a control option of the user interface, the help control referencing the control option for obtaining help information about the control option, wherein the help control is displayed automatically without user interaction in response to a detected status of the control option, including a noteworthy status of the control option.

11. The computing system of claim 10 wherein the help control includes a graphical button representing selectable help information available for the control option.

12. The computing system of claim 10 wherein the help control enables a display of context sensitive help information for the control option in the event the help control is selected by a user.

13. The computing system of claim 12 wherein the context sensitive help information includes instructions for enabling the control option in the event the control option is disabled, and wherein the context sensitive help information includes information as to why the control option is noteworthy in the event the control option is enabled.

14. A method of providing a help feature for a user interface having a control option, the method comprising:
  (a) detecting a status of the control option; and,
  (b) responsive to the status detected, automatically displaying a help control adjacent to the control option without user interaction, the help control referencing the control option for obtaining help information about the control option.

15. The method of claim 14 wherein the help control is automatically displayed adjacent to the control option in the event the status detected is indicative of the control option being noteworthy.

16. The method of claim 14 wherein the help control includes a graphical button indicative of help information available for the control option.

17. The method of claim 14 further including displaying help information for the control option in the event the help control is selected by a user.

18. The method of claim 17 wherein the help information is context sensitive.

19. The method of claim 17 wherein the help information includes instructions for enabling the control option in the event the control option is disabled, and wherein the help information includes information as to why the control option is noteworthy in the event the option is enabled.

20. A computer-readable medium having computer-executable instructions for performing the following:
  (a) displaying a user interface having a control option;
  (b) detecting a status of the control option; and,
  (c) responsive to the status detected, automatically displaying a help control adjacent to the control option without user interaction, the help control referencing the control option for obtaining help information about the control option.

* * * * *